(12) United States Patent
Kawashima et al.

(10) Patent No.: US 8,941,804 B2
(45) Date of Patent: Jan. 27, 2015

(54) LIQUID CRYSTAL DISPLAY DEVICE

(75) Inventors: Yuki Kawashima, Osaka (JP);
Yasutoshi Tasaka, Osaka (JP);
Yasuyoshi Kaise, Osaka (JP); Noboru Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 13/990,891

(22) PCT Filed: Dec. 21, 2011

(86) PCT No.: PCT/JP2011/079607
§ 371 (c)(1),
(2), (4) Date: May 31, 2013

(87) PCT Pub. No.: WO2012/090810
PCT Pub. Date: Jul. 5, 2012

(65) Prior Publication Data
US 2013/0271715 A1    Oct. 17, 2013

(30) Foreign Application Priority Data

Dec. 28, 2010 (JP) .................... 2010-294115

(51) Int. Cl.
*G02F 1/136* (2006.01)
*G02F 1/1343* (2006.01)
*G02F 1/1362* (2006.01)

(52) U.S. Cl.
CPC .... *G02F 1/134336* (2013.01); *G02F 1/136227* (2013.01); *G02F 2201/40* (2013.01)
USPC ............................................. 349/141; 349/43

(58) Field of Classification Search
USPC ............................................. 349/39, 43, 141
See application file for complete search history.

(56) References Cited

U.S. PATENT DOCUMENTS

| 7,130,009 B2* | 10/2006 | Saigo et al. ................... 349/141 |
| 7,940,362 B2* | 5/2011 | Saigo et al. ................... 349/141 |
| 8,471,992 B2* | 6/2013 | Harada et al. ................. 349/141 |
| 2004/0070718 A1 | 4/2004 | Saigo et al. |

OTHER PUBLICATIONS

Official Communication issued in International Patent Application No. PCT/JP2011/079607, mailed on Mar. 19, 2012.

* cited by examiner

*Primary Examiner* — James Dudek
(74) *Attorney, Agent, or Firm* — Keating & Bennett, LLP

(57) ABSTRACT

Arbitrary one pixel P (contact hole pixel (13)) is selected in a predetermined demarcated area (20) of the liquid crystal display device of the present invention. The pixel P is (i) any of four pixels Q1 through Q4 (contact hole pixels (13)) closest to another pixel P or (ii) (a) contained in a quadrangle whose vertices correspond to respective four pixels Q1 through Q4 closest to the pixel P and (b) any of four pixels Q1 through Q4 closest to another pixel P. Further, two diagonal lines of a quadrangle formed by four pixels Q1 through Q4 are inclined at respective two angles with respect to a gate bus line (line segment A-B), and a difference between the two angles is smaller than 30 degrees. Moreover, the contact hole pixels (13) are provided for respective source bus lines in the predetermined demarcated area (20).

6 Claims, 6 Drawing Sheets

LIQUID CRYSTAL DISPLAY DEVICE

TECHNICAL FIELD

The present invention relates to a liquid crystal display device. In particular, the present invention relates to a liquid crystal display device in which a contact hole for connecting a common line with a common electrode is provided.

BACKGROUND ART

In recent years, thin flat panel displays (FPD) as a display device are becoming popular, instead of CRT (cathode ray tube) display devices which have conventionally been mainly used. In the FPDs, display elements such as liquid crystal, light-emitting diode (LED), and organic electroluminescence (organic EL) are utilized. Among such FPDs, display devices utilizing liquid crystal have been studied and developed actively, because of their advantages such as thin body, light weight, and low power consumption.

FIG. 6 schematically illustrates a configuration of a pixel of such a liquid crystal display device. In general, in a pixel 41, (i) a gate bus line 7 and a source bus line 8 are arranged so as to perpendicularly intersect with each other, and (ii) a common line 9, which is a wire for forming a storage capacitor (Cs), is arranged in parallel with the gate bus line 7. Meanwhile, a common electrode 4 and a pixel electrode 6 are provided so as to overlap each other, and a thin film transistor (TFT) is provided at an intersection of the gate bus line 7 and the source bus line 8 as a switching element (active element). Here, in a case where wiring of the common electrode 4 is made of a material having relatively high resistance, a defective display such as a cross talk may be caused.

In order to prevent such a defective display, a technique has been developed in which a contact hole is provided for connecting the common electrode with the common line so that wiring resistance of the common electrode is reduced. For example, Patent Literature 1 discloses a configuration in which each of contact holes, which connect a common electrode with a common line, is provided for each set of a plurality of pixels, and the contact holes are arranged in a staggered manner.

According to the configuration, the common electrode having high resistance is connected with the common line having low resistance so as to (i) reduce wiring resistance and (ii) decrease a probability of short circuit between a bus line and the common electrode via the contact hole.

CITATION LIST

Patent Literature

Patent Literature 1
Japanese Patent Application Publication Tokukai No. 2004-109248 A (Publication date: Apr. 8, 2004)

SUMMARY OF INVENTION

Technical Problem

In a case where contact holes, which connect a common electrode with a common line, are provided for respective all pixels, a defective display such as decreased luminance is caused due to a decrease in aperture ratio of a display panel. On the other hand, according to Patent Literature 1, each one (1) of contact holes, which are arranged in the staggered manner, is provided for each set of four pixels, unlike the configuration in which the contact holes are respectively provided for all the pixels. However, some of pixels, in which the contact holes are respectively provided, may be seen as an unintended line, depending on (i) a distance between pixels in which the contact holes are respectively provided and (ii) a cycle of arranged locations of the contact holes. In a case where, for example, contact holes 12 are arranged in a pattern as illustrated in FIG. 7, an oblique line (indicated by an arrow N in FIG. 7) is seen on a display panel 15, i.e., display quality of a screen of the display panel 15 is deteriorated. This defective display becomes further notable, as a degree of decrease in aperture ratio becomes higher by providing the contact holes.

The present invention is accomplished in view of the problems, and its object is to provide a liquid crystal display device that can (i) reduce wiring resistance of a common electrode and (ii) prevent a decrease in display quality.

Solution to Problem

In order to attain the object, a liquid crystal display device of an aspect of the present invention includes: a plurality of pixels which are provided in a first substrate in a matrix manner; a plurality of source bus lines provided for respective columns of the plurality of pixels; a plurality of gate bus lines provided for respective rows of the plurality of pixels; a plurality of pixel electrodes which are provided in the first substrate for the respective plurality of pixels; a common electrode which is provided in the first substrate and overlaps the plurality of pixel electrodes; a common line which is connected with the common electrode via any of contact holes that are provided in respective some of the plurality of pixels; and a liquid crystal layer which is provided between the first substrate and a second substrate that faces the first substrate, the liquid crystal display device being configured by repeatedly arranging predetermined demarcated areas each of which contains a set of pixels out of the plurality of pixels, in each of the predetermined demarcated areas, an arbitrary one of the contact holes (i) being any one of four contact holes which are closest to another one of the contact holes or (ii) being (a) any one of four contact holes which are closest to another one of the contact holes and (b) contained in a quadrangle whose vertices correspond to respective four contact holes that are closest to the arbitrary one of the contact holes, the quadrangle having two diagonal lines which are inclined at respective two angles with respect to a row direction in which the plurality of gate bus lines extend, a difference between the two angles being smaller than 30 degrees, and in each of the predetermined demarcated areas, the contact holes being provided for the respective source bus lines.

According to the configuration, the difference between the two angles is smaller than 30 degrees, that is, the contact holes are aligned in the oblique direction. This alignment prevents deterioration in visibility of a display screen, as compared to an arrangement in which the contact holes are aligned in a longitudinal direction or a transverse direction. Further, according to the liquid crystal display device in accordance with an aspect of the present invention, in each of the predetermined demarcated areas, the contact holes are provided for the respective source bus lines. This is because, in a case where the number of contact holes is not identical with the number of source bus lines in the predetermined demarcated area, loads on the bus lines are to vary, and this may deteriorate display quality of the liquid crystal display device. In view of this, the contact holes are provided for all the respective source bus lines in the predetermined demarcated area (i.e., the number of the contact holes is identical with the number of the source bus lines in the predetermined demarcated area).

Under the circumstances, according to the liquid crystal display device in accordance with an aspect of the present invention, the contact holes are arranged so as to meet the above described two requirements. According to the arrangement, the contact hole pixels are dispersed as appropriate, and it is therefore possible to prevent the contact holes from being seen as unintended lines or the like on the display screen. In the first place, since the contact holes are provided for connecting the common electrode with the common line, it is possible to lower the wiring resistance of the common electrode. That is, according to an aspect of the present invention, it is possible to achieve both (i) suppression of decrease in display quality due to the contact holes and (ii) reduction in wiring resistance of the common electrode.

For a fuller understanding of the other objects, natures, excellent points, and advantages of the present invention, reference should be made to the ensuing detailed description taken in conjunction with the accompanying drawings.

ADVANTAGEOUS EFFECTS OF INVENTION

According to the liquid crystal display device in accordance with an aspect of the present invention, in each of the predetermined demarcated areas, the contact holes are arranged so that (i) one contact hole is contained in a quadrangle whose vertices correspond to respective four contact holes closest to the one contact hole and (ii) a difference of two angles, at which respective two diagonal lines of the quadrangle are inclined with respect to a gate bus line, is smaller than 30 degrees. Further, in the predetermined demarcated area, the contact hole pixels are provided for respective source bus lines. According to the configuration, the contact hole pixels are dispersed as appropriate, and it is therefore possible to prevent the contact holes from being seen as unintended lines or the like on a display screen. Moreover, it is possible to lower wiring resistance of the common electrode, because, in the first place, the contact holes are provided for connecting the common electrode with the common line. That is, according to an aspect of the present invention, it is possible to achieve both (i) suppression of decrease in display quality due to the contact holes and (ii) reduction in wiring resistance of the common electrode.

DESCRIPTION OF EMBODIMENTS

The following description will discuss in detail a liquid crystal display device in accordance with an embodiment of the present invention, with reference to drawings.

(Configuration of Liquid Crystal Display Device)

Figure 2:
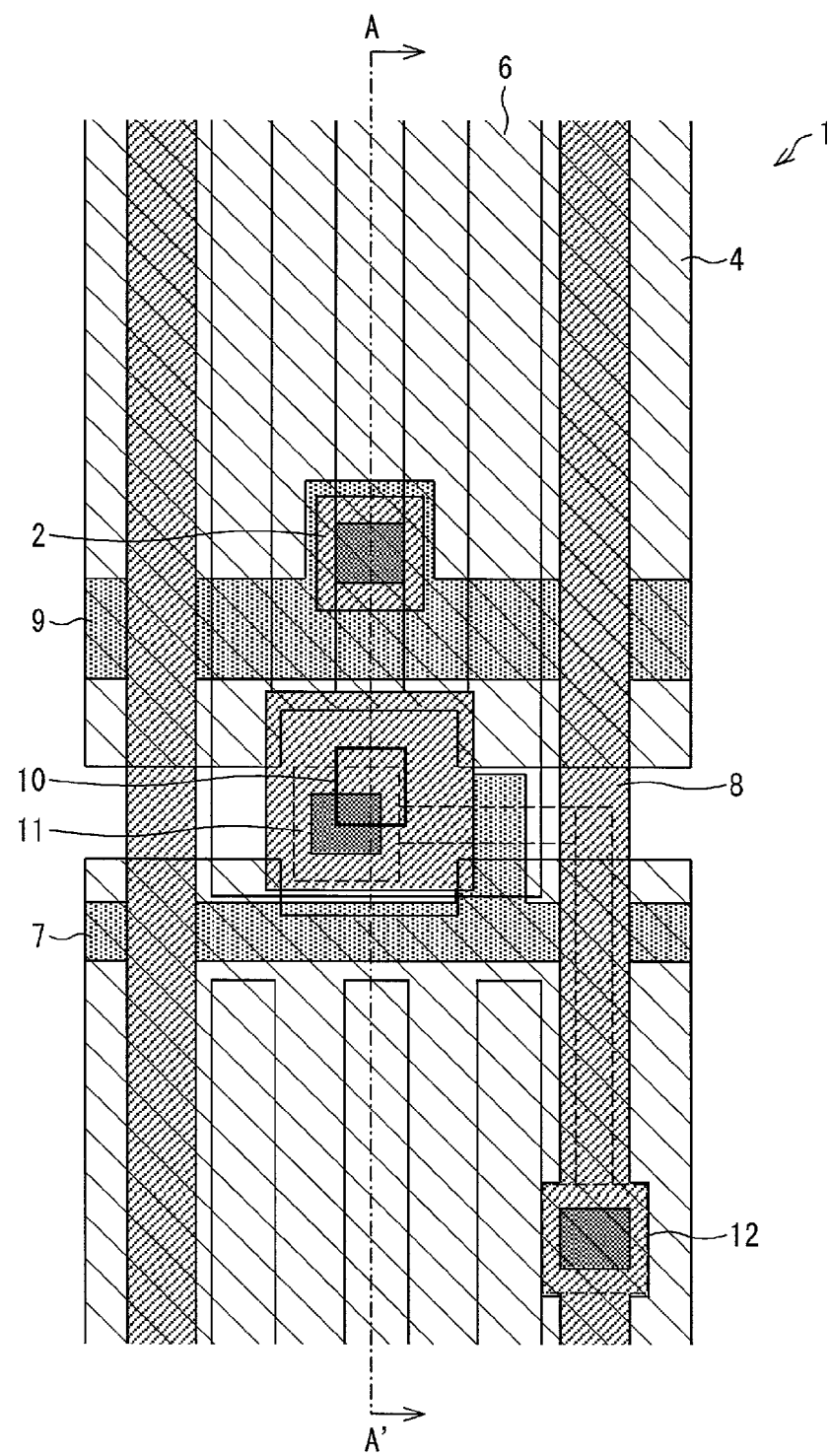
FIG. 2 is a view schematically illustrating a configuration of a pixel in a liquid crystal display device in accordance with an embodiment of the present invention.
Figure 3:
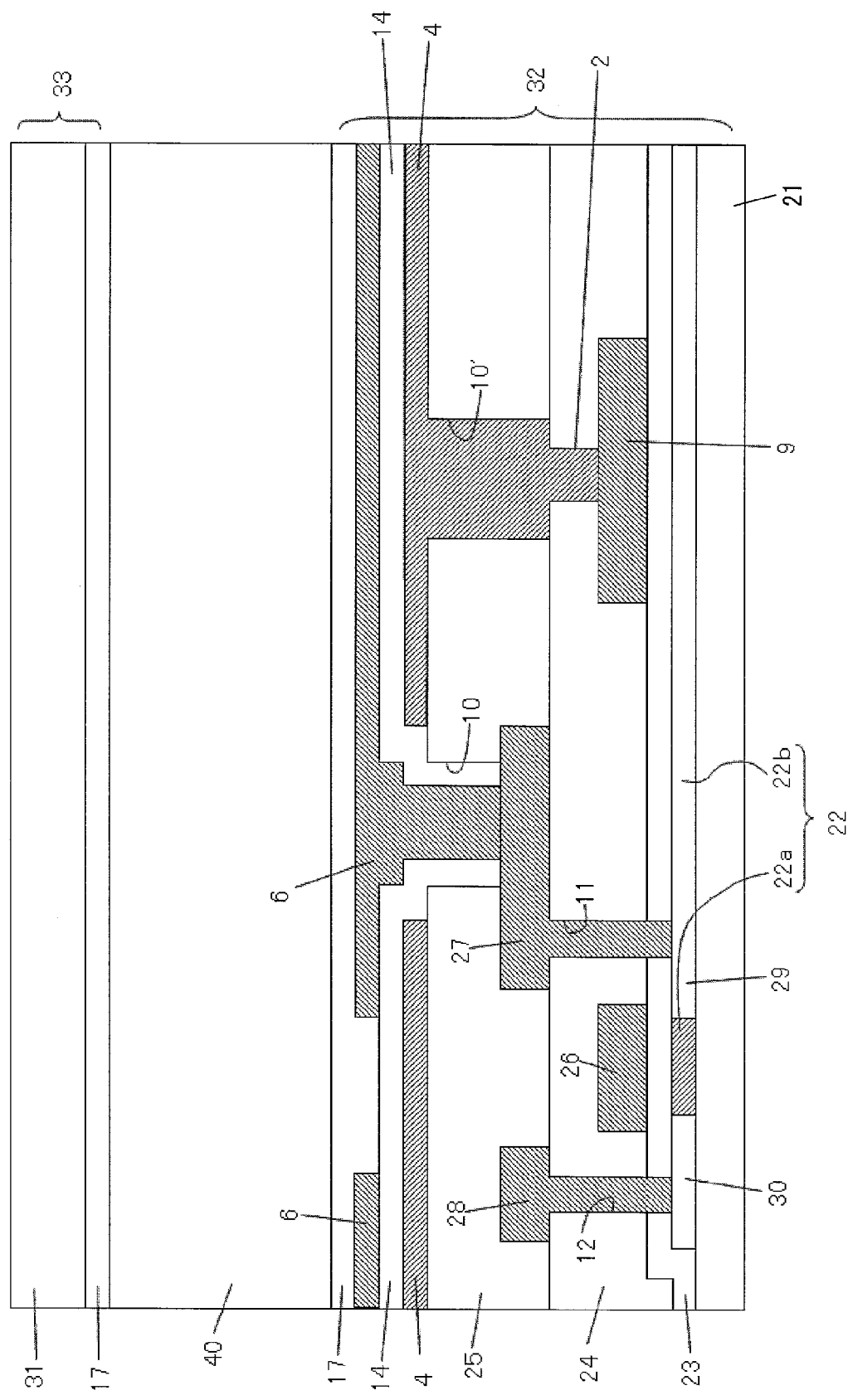
FIG. 3 is a cross sectional view illustrating a pixel in accordance with an embodiment of the present invention.

First, the following description will discuss pixels that constitute a pixel array in a liquid crystal display device of the present embodiment, with reference to FIGS. 2 and 3. FIG. 2 is a view schematically illustrating a configuration of a pixel 1 in the liquid crystal display device of the present embodiment. FIG. 3 is a cross sectional view of the pixel 1 taken along the line A-A' of FIG. 2.

The pixel array is made up of a plurality of pixels which are arranged in a matrix manner. A plurality of source bus lines are provided for respective columns of the plurality of pixels, and a plurality of gate bus lines are provided for respective rows of the plurality of pixels.

Specifically, a gate bus line 7, via which a scanning signal is supplied, and a source bus line 8, via which a data signal is supplied, are arranged so as to perpendicularly intersect with each other, and a common line 9 for forming a storage capacitor (Cs) is arranged in parallel with the gate bus line 7 (see FIG. 2). Meanwhile, a common electrode 4 and a pixel electrode 6 are provided so as to overlap each other. That is, the liquid crystal display device of the present embodiment is a liquid crystal display device that is driven in an In-Plane Switching mode. At an intersection of the gate bus line 7 and the source bus line 8, a thin film transistor (TFT) is provided as a switching element (active element). The TFT has (i) a gate electrode connected with the gate bus line 7, (ii) a drain electrode connected with the pixel electrode 6, and (iii) a source electrode connected with the source bus line 8.

In the pixel 1, a TFT substrate 32 (first substrate), which is made up of a transparent substrate 21 on which an alignment film 17 and a TFT are provided, is provided so as to face a counter substrate 33 (second substrate) which is made up of a transparent substrate 31 on which another alignment film 17 is provided (see FIG. 3). Further, a liquid crystal layer 40 is provided between the TFT substrate 32 and the counter substrate 33, i.e., between the alignment film 17 and the another alignment film 17 (see FIG. 3). Plates such as a phase plate and a polarizing plate (which are not illustrated) are provided as appropriate on outer sides of the TFT substrate 32 and the counter substrate 33 (i.e., sides of the substrates 32 and 33 which sides are opposite to facing sides of the substrates 32 and 33).

In the TFT substrate 32, the TFT is provided on a surface of the transparent substrate, which surface faces the counter substrate 33. The TFT includes a semiconductor layer 22, a gate insulating film 23, a gate electrode 26, a first interlayer insulating film 24, a second interlayer insulating film 25, a pixel electrode 6, a drain electrode 27, and a source electrode 28. The gate electrode 26 of the TFT in the TFT substrate 32 is made up of a part of the gate bus line 7, and the source electrode 28 of the TFT is made up of a part of the source bus line 8. The semiconductor layer 22 has (i) a channel region 22a constituted by an intrinsic semiconductor which is not doped with an impurity and (ii) an impurity-doped region 22b constituted by an extrinsic semiconductor (P-type semiconductor or N-type semiconductor) which is doped with an impurity. The impurity-doped region 22b has a drain part 29 and a source part 30.

The drain part 29 in the semiconductor layer 22 is connected with the drain electrode 27 via a contact hole 11 that is formed in the gate insulating film 23 and the first interlayer insulating film 24 which cover the semiconductor layer 22. Similarly, the source part 30 is connected with the source electrode 28 via a contact hole 12 that is formed in the gate insulating film 23 and the first interlayer insulating film 24. The drain electrode 27 is electrically connected with the pixel electrode 6 via a through hole 10 that is formed in the second interlayer insulating film 25 which covers the gate bus line 7 and the source bus line 8. In this case, the pixel electrode 6 and the common electrode 4 overlap each other via an insulating film 14 in the TFT substrate 32. Here, in a case where the common electrode 4 is made up of a transparent electric conductor, the common electrode 4, which overlaps the pixel electrode 6, causes light to pass through. This allows a transmissive aperture ratio to be increased, and accordingly entire transmittance is improved. Note that another common electrode 4 may be provided in the counter substrate 33. In a case where such another common electrode 4 is provided in the counter substrate 33, it is possible to form a vertical electric field between the another common electrode 4 and the pixel electrode 6. This makes it possible to employ a vertical alignment mode as a liquid crystal mode.

In the pixel 1 of the present embodiment, a contact hole 2 is formed in the first interlayer insulating film 24 so that the common electrode 4 and the common line 9 are connected with each other via the contact hole 2 and a through hole 10' that is formed in the second interlayer insulating film 25. The contact holes 2 are not provided in all the pixels 1 but are provided merely in respective some of the pixels 1 so that the pixels 1 in which the contact holes 2 are respectively provided are spaced away from each other. Details of arrangement of the contact holes 2 will be described below.

(Arrangement of Contact Holes 2)

In a case where the common electrode 4 of the pixel 1 is made up of a transparent electrode such as an indium tin oxide (ITO) electrode, wiring resistance becomes higher than those of other electrodes such as the gate electrode 26. This may cause a decrease in display quality, such as a cross talk. Here, the common line 9 is formed from a gate electrode layer such as gate electrode metal, and therefore the common line 9 has resistance lower than that of the common electrode 4. Under the circumstances, the common electrode 4 and the common line 9 is connected with each other via the contact hole 2 in the present embodiment. This allows wiring resistance of the common electrode 4 to be decreased, and it is therefore possible to suppress deterioration in display quality. Note, however, that, in this case, it should be considered that, for example, (i) a pixel aperture ratio may be decreased by providing the contact hole 2 and (ii) a yield rate may be decreased due to the contact hole 2. Further, the pixels 1, in which the contact holes 2 are respectively formed, may be seen as an unintended line or the like, depending on an arrangement of the contact holes 2. In view of this, it is preferable to disperse the contact holes 2 as appropriate so that the pixels 1 in which the contact holes 2 are respectively provided are spaced away from each other.

Figure 1:
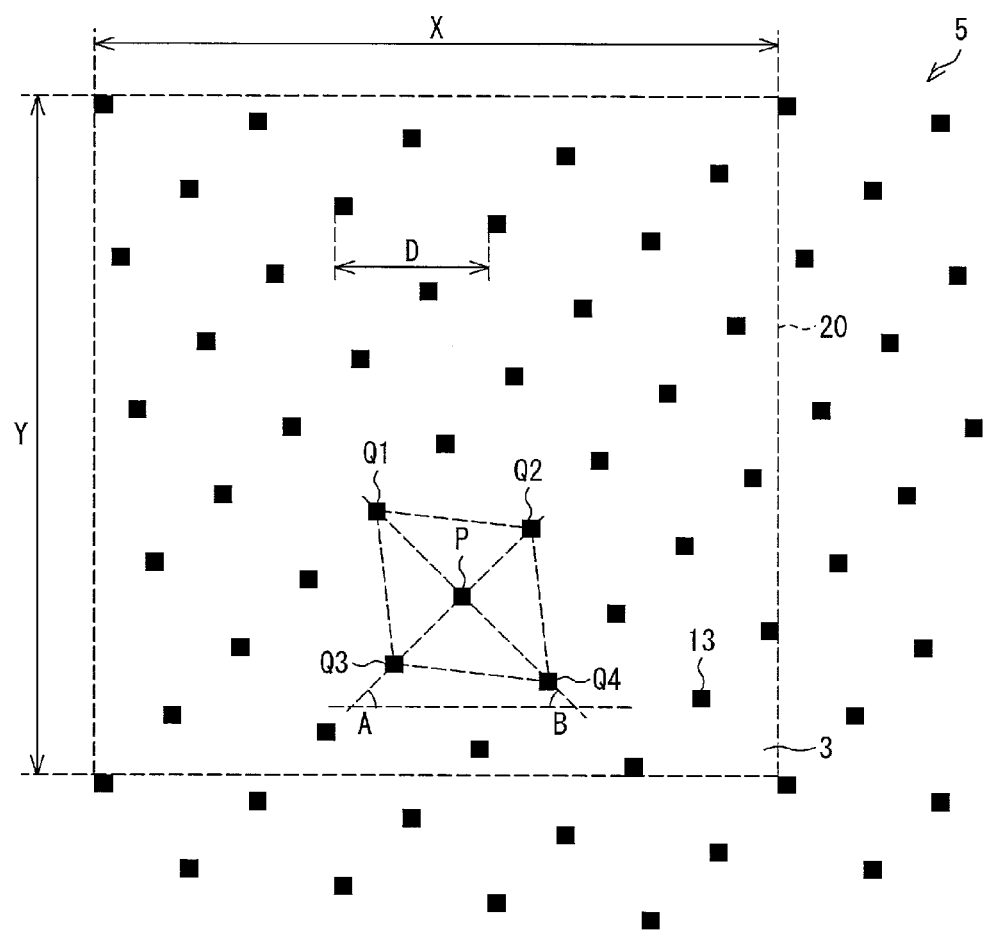
FIG. 1 is a view schematically illustrating an arrangement of contact holes in accordance with an embodiment of the present invention.

Under the circumstances, the inventors of the present invention have found a configuration in which display quality is least deteriorated and wiring resistance of the common electrode 4 can be lowered, as a result of various studies on display quality that varies in accordance with an arrangement of the contact holes 2. The following description will discuss such a configuration, with reference to FIG. 1. FIG. 1 is a view schematically illustrating how the contact holes 2 are arranged in the present embodiment.

Figure 4:
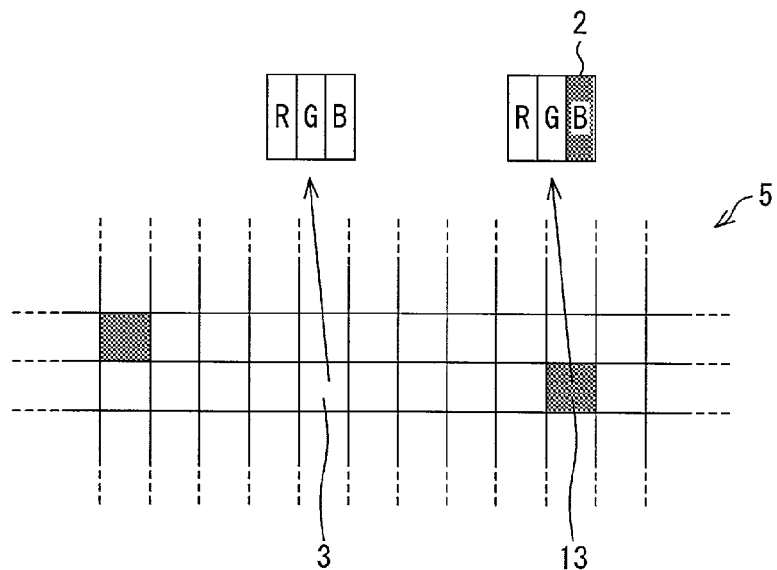
FIG. 4 is a view schematically illustrating a pixel array in accordance with an embodiment of the present invention.

A pixel array 5 of the present embodiment is configured by repeatedly arranging a plurality of predetermined demarcated areas 20 each of which has a quadrangular shape and contains a plurality of pixels 1 (see FIG. 1). In other words, each of the plurality of predetermined demarcated areas 20 is a constituent unit of the pixel array 5. Here, a reference numeral "13" in FIG. 1 indicates a pixel 1 (hereinafter, referred to as "contact hole pixel") in which a contact hole 2 is provided. Meanwhile, a reference numeral "3" in FIG. 1 indicates pixels 1 in which no contact hole 2 is provided. According to the present embodiment, one (1) pixel 1 is made up of three subpixels (R pixel, G pixel, and B pixel) (see FIG. 4), and, in a contact hole pixel 13, a contact hole 2 is formed in any one of the subpixels (in a case of FIG. 4, B pixel). As such, the contact hole 2 does not need to be formed across the entire contact hole pixel 13 but can be formed in any one of the subpixels that constitute the pixel 1. Note that the subpixels are not limited in particular, that is, the subpixels are not limited to the R pixel, the G pixel, and the B pixel but can be four or more subpixels.

According to the present embodiment, the arrangement of the contact hole pixels 13 in the pixel array 5 needs to meet the following two requirements. The following description will discuss the first requirement. In the predetermined demarcated area 20, pixels Q1 through Q4 are specified as respective four contact hole pixels 13 that are closest to a pixel P, which is one contact hole pixel 13 (see FIG. 1). The four pixels Q1 through Q4 constitute a quadrangle whose vertices correspond to the respective four pixels Q1 through Q4, and the pixel P is contained in the quadrangle. An arbitrary one contact hole pixel 13 contained in the predetermined demarcated area 20 of the present embodiment is (i) any one of pixels Q1 through Q4 which are closest to a pixel P or (ii) any one of pixels Q1 through Q4 and another pixel P. That is, the arbitrary one contact hole pixel 13 contained in the predetermined demarcated area 20 is (i) any of four contact hole pixels 13 which are closest to another contact hole pixel 13 or (ii) a contact hole pixel 13 that is (a) any of four contact hole pixels 13 which are closest to another contact hole pixel 13 and (b) contained in a quadrangle whose vertices correspond to respective another four contact hole pixels 13 which are closest to the arbitrary one contact hole pixel 13.

Further, according to the present embodiment, (i) the quadrangle, whose vertices correspond to the respective four pixels Q1 through Q4, has two diagonal lines which are inclined with respect to a gate bus line (line segment A-B) at respective two angles, and (ii) a difference between the two angles is smaller than 30 degrees. That is, pixels Q1 through Q4 are arranged around a pixel P so as to satisfy the following formula, that is: $abs\{\angle ABQ1(=\angle ABQ4)-\angle BAQ2(=\angle BAQ3)\}<30$ degrees. In a case where a difference between $\angle ABQ1$ and $\angle BAQ2$ is smaller than 30 degrees, contact hole pixels 13 are to be aligned in an oblique direction in the pixel array 5. This configuration is employed because the alignment in the oblique direction hardly deteriorates visibility of a display screen, as compared to an arrangement in which the contact hole pixels 13 are aligned in a longitudinal direction or a transverse direction. The first requirement of how to arrange the contact hole pixels 13 has been thus described.

Figure 5:
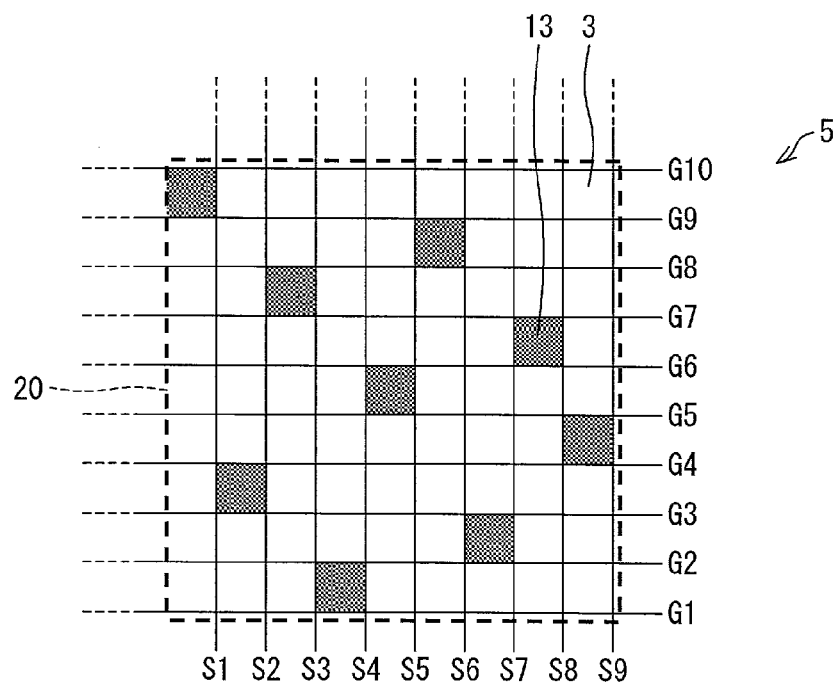
FIG. 5 is a view schematically illustrating a pixel array in accordance with an embodiment of the present invention.
Figure 6:
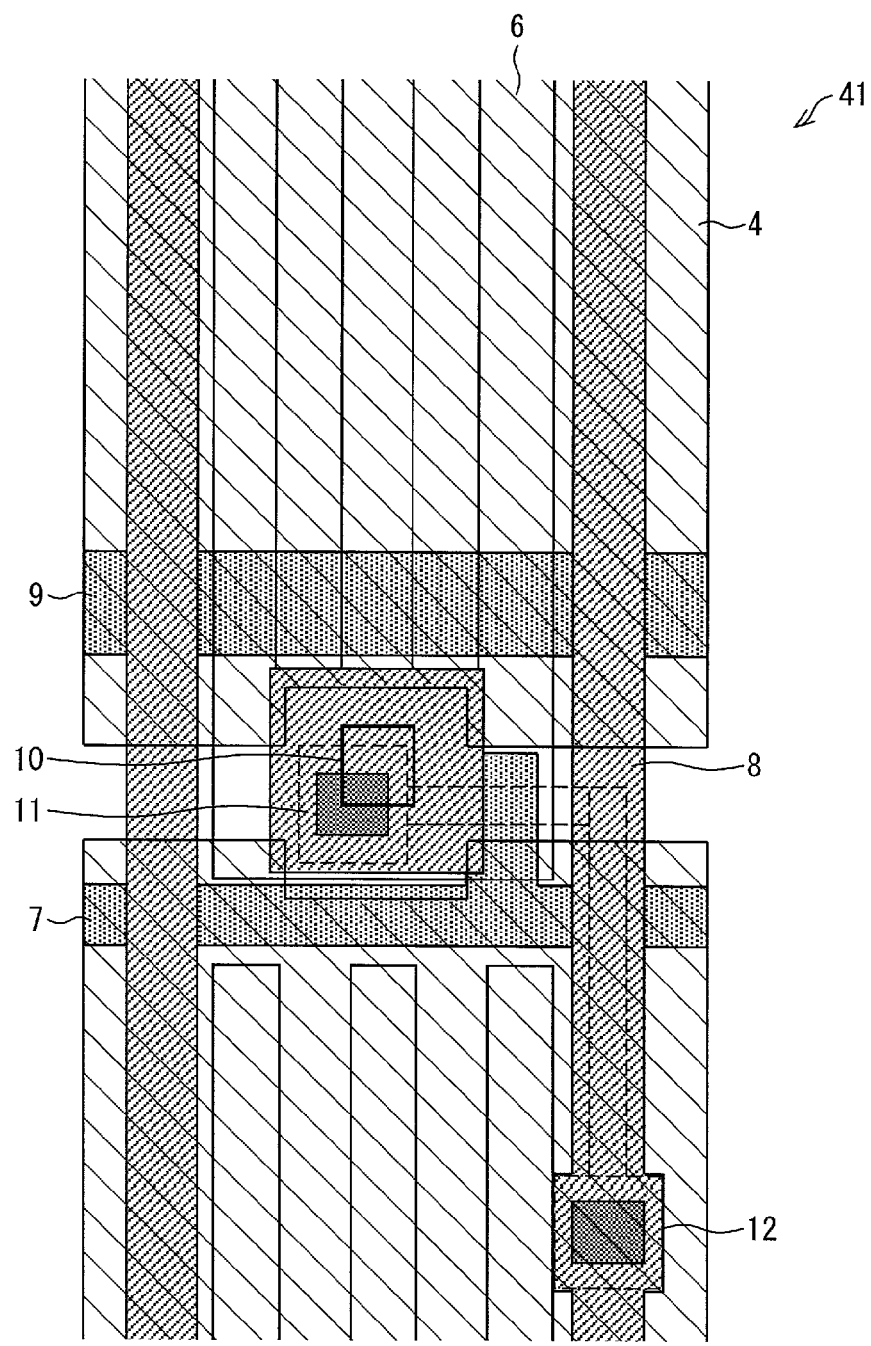
FIG. 6 is a view schematically illustrating a configuration of a pixel in a conventional liquid crystal display device.
Figure 7:
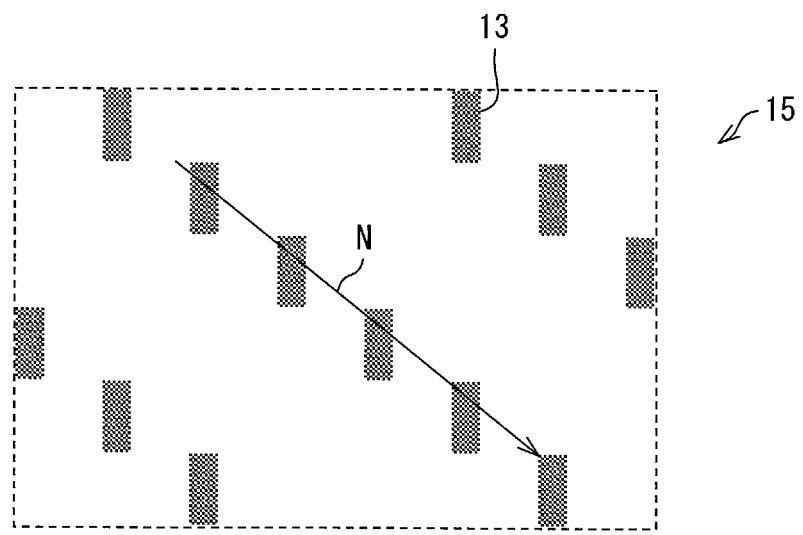
FIG. 7 is a view schematically illustrating a conventional pixel array.

The following description will discuss the second requirement. In the predetermined demarcated area 20, the contact hole pixels 13 are provided for the respective source bus lines 8 (see FIG. 1). The following description discusses this arrangement in detail, with reference to FIG. 5. FIG. 5 is a view schematically illustrating the pixel array 5. In FIG. 5, distances between contact hole pixels 13 are rather short in order to easily describe how to arrange the contact hole pixels 13. Note, however, that the distances between contact hole pixels 13 are not limited to this in particular.

In the predetermined demarcated area 20, only one contact hole pixel 13 is provided for a source bus line S1, that is, the only one contact hole pixel 13 is located in the upper left of an intersection of the source bus line S1 and a gate bus line G9 in the sheet on which FIG. 5 is illustrated. Moreover, only another one contact hole pixel 13 is provided for a source bus line S2, that is, the only another one contact hole pixel 13 is located in the upper left of an intersection of the source bus line S2 and a gate bus line G3 in the sheet on which FIG. 5 is illustrated. Similarly, only one contact hole pixel 13 is provided in the upper left of an intersection of each of source bus lines S3 through S9 and any one of gate bus lines. As such, the contact hole pixels 13 are provided for the respective source bus lines 8 in the predetermined demarcated area 20. If the number of contact hole pixels 13 is not identical with the number of source bus lines 8 in the predetermined demarcated area 20, loads on the bus lines are to vary, and this may deteriorate display quality of the liquid crystal display device. In view of this, the contact hole pixels 13 are provided for all the respective source bus lines 8 in the predetermined demarcated area 20. The second requirement of how to arrange the contact hole pixels 13 has been thus described.

Under the circumstances, in the pixel array 5 of the present embodiment, the contact hole pixels 13 are arranged so as to meet the above described two requirements. According to the arrangement, the contact hole pixels 13 are dispersed as appropriate in the pixel array 5, and it is therefore possible to prevent the contact hole pixels 13 from being seen as unintended lines or the like on the display screen. In the first place, since the contact holes 2 are provided for connecting the common electrode 4 with the common line 9, it is possible to lower the wiring resistance of the common electrode 4. That is, according to the present embodiment, it is possible to achieve both (i) suppression of decrease in display quality due to the contact holes 2 and (ii) reduction in wiring resistance of the common electrode 4.

A distance (i.e., distance "D" in FIG. 1) between two contact hole pixels 13 adjacent to each other in a row direction is determined by taking into consideration (i) a degree to which wiring resistance of the common electrode 4 would be reduced, (ii) a tolerance on a decrease in aperture ratio caused by providing the contact hole pixels 13, and (iii) display quality. The same applies to a distance between one contact hole pixel 13 and each of four contact hole pixels 13 which are closest to the one contact hole pixel 13.

The present invention is not limited to the embodiments, but can be altered by a skilled person in the art within the scope of the claims. An embodiment derived from a proper combination of technical means disclosed in respective different embodiments is also encompassed in the technical scope of the present invention.

[Main Points of Embodiment]

As described above, according to the liquid crystal display device in accordance with an aspect of the present invention, it is preferable that each of the predetermined demarcated areas is a quadrangular area whose (i) length in a column direction corresponds to 40 pixels and (ii) length in the row direction corresponds to 40 pixels.

According to the liquid crystal display device in accordance with an aspect of the present invention, it is preferable that each of the predetermined demarcated areas is a quadrangular area whose (i) length in a column direction corresponds to 80 pixels and (ii) length in the row direction corresponds to 80 pixels.

According to the configuration, the predetermined demarcated areas, in each of which contact holes are dispersed as appropriate, are arrayed in a matrix manner, and accordingly the liquid crystal display device is configured to have the contact holes which are dispersed as appropriate.

According to the liquid crystal display device in accordance with an aspect of the present invention, each of the plurality of pixels is made up of a plurality of subpixels; and each of the contact holes is formed in any one of the plurality of subpixels.

According to the configuration, one contact hole is formed in any one of the plurality of subpixels constituting one pixel. This makes it possible to sufficiently achieve both (i) suppression of decrease in display quality due to the contact holes and (ii) reduction in wiring resistance of the common electrode.

According to the liquid crystal display device in accordance with an aspect of the present invention, the common electrode is made of a transparent electric conductor.

According to the configuration, the common electrode, which overlaps the pixel electrodes, is made of the transparent electric conductor that causes light to pass through. This allows an increase in transmissive aperture ratio, and accordingly entire transmittance is improved.

According to the liquid crystal display device in accordance with an aspect of the present invention, another common electrode is provided in the second substrate, the another common electrode being identical with the common electrode.

According to the configuration, in a case where the another common electrode is provided in the second substrate, it is possible to form a vertical electric field between the another common electrode and the pixel electrode. This makes it possible to employ a vertical alignment mode as a liquid crystal mode.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

EXAMPLE

The following description will further discuss the present invention in detail, with reference to Example. Note, however, that the present invention is not limited to the Example without departing from the scope of the present invention.

First and second liquid crystal display devices were prepared in conformity with the two requirements of how to arrange contact hole pixels (i.e., pixels in which contact holes are respectively provided). The first liquid crystal display device was configured to have demarcated areas (i) each of which contained 40 pixels×40 pixels and (ii) which were arrayed in a matrix manner. In each of the demarcated areas, contact hole pixels were arranged so that both of two diagonal lines of a quadrangle, whose vertices correspond to respective contact hole pixels closest to one contact hole pixel, were inclined with respect to a gate bus line at 45 degrees. Moreover, a distance between contact hole pixels provided for adjacent two gate bus lines was a distance defined by 9 pixels. In a case where an aperture ratio of the first liquid crystal display device was decreased by 15%, no unintended lines or the like were seen on a display screen, and therefore good display quality was obtained. Further, in a case where the aperture ratio of the first liquid crystal display device was decreased by 30%, unintended lines or the like were hardly seen on the display screen, and therefore good display quality was obtained.

The second liquid crystal display device was configured to have demarcated areas (i) each of which contained 80 pixels× 80 pixels and (ii) which were arrayed in a matrix manner. In each of the demarcated areas, contact hole pixels were arranged so that two diagonal lines of a quadrangle, whose vertices correspond to the respective contact hole pixels closest to one contact hole pixel, were inclined with respect to a gate bus line at 45 degrees and 66.8 degrees, respectively. Moreover, a distance between contact hole pixels provided for adjacent two gate bus lines was a distance defined by 11 pixels. In a case where an aperture ratio of the second liquid crystal display device was decreased by 15%, unintended lines or the like were hardly visible on a display screen, and therefore good display quality was obtained. Further, in a case where the aperture ratio of the second liquid crystal display device was decreased by 30%, unintended lines or the like were hardly visible on the display screen, and therefore good display quality was obtained.

As such, a liquid crystal display device (i) in which unintended lines or the like are hardly visible on a display screen and (ii) which has good display quality can be obtained by arranging contact hole pixels in the predetermined demarcated area such that (i) (a) two diagonal lines of a quadrangle, whose vertices correspond to respective four contact hole pixels closest to one contact hole pixel, are inclined with respect to a gate bus line at respective two angles and (b) a difference of the two angles is smaller than 30 degrees and (ii) the contact hole pixels are provided for respective source bus lines. In particular, according to the first liquid crystal display device, unintended lines or the like were hardly visible on the display screen and better display quality was obtained than the second liquid crystal display device. From this, it was found to be preferable to set the two angles to 45 degrees or angles near to 45 degrees.

Industrial Applicability

The liquid crystal display device of the present invention is suitably applicable to a display device of electronic equipment such as a personal computer, a mobile phone, a personal digital assistance, a portable music player, or a digital camera.

Reference Signs List
1: Pixel
2: Contact hole
3: Pixel without contact hole
4: Common electrode
5: Pixel array
6: Pixel electrode
7: Gate bus line
8: Source bus line
9: Common line
10: Through hole
10': Through hole
11: Contact hole
12: Contact hole
13: Contact hole pixel (pixel with contact hole)
14: Insulating film
15: Display panel
17: Alignment film
20: Predetermined demarcated area
21: Transparent substrate
22: Semiconductor layer
22a: Channel region
22b: Impurity-doped region
23: Gate insulating film
24: First interlayer insulating film
25: Second interlayer insulating film
26: Gate electrode
27: Drain electrode
28: Source electrode
29: Drain part
30: Source part
31: Transparent substrate
32: TFT substrate
33: Counter substrate
40: Liquid crystal layer
41: Pixel

The invention claimed is:

1. A liquid crystal display device comprising:
 a plurality of pixels which are provided in a first substrate in a matrix manner;
 a plurality of source bus lines provided for respective columns of the plurality of pixels;
 a plurality of gate bus lines provided for respective rows of the plurality of pixels;
 a plurality of pixel electrodes which are provided in the first substrate for the respective plurality of pixels;
 a common electrode which is provided in the first substrate and overlaps the plurality of pixel electrodes;
 a common line which is connected with the common electrode via any of contact holes that are provided in respective some of the plurality of pixels; and
 a liquid crystal layer which is provided between the first substrate and a second substrate that faces the first substrate,
 said liquid crystal display device being configured by repeatedly arranging predetermined demarcated areas each of which contains a set of pixels out of the plurality of pixels,
 in each of the predetermined demarcated areas, an arbitrary one of the contact holes (i) being any one of four contact holes which are closest to another one of the contact holes or (ii) being (a) any one of four contact holes which are closest to another one of the contact holes and (b) contained in a quadrangle whose vertices correspond to respective four contact holes that are closest to the arbitrary one of the contact holes, the quadrangle having two diagonal lines which are inclined at respective two angles with respect to a row direction in which the plurality of gate bus lines extend, a difference between the two angles being smaller than 30 degrees, and
 in each of the predetermined demarcated areas, the contact holes being provided for the respective source bus lines.

2. The liquid crystal display device as set forth in claim 1, wherein:
 each of the predetermined demarcated areas is a quadrangular area whose (i) length in a column direction corresponds to 40 pixels and (ii) length in the row direction corresponds to 40 pixels.

3. The liquid crystal display device as set forth in claim 1, wherein:
 each of the predetermined demarcated areas is a quadrangular area whose (i) length in a column direction corresponds to 80 pixels and (ii) length in the row direction corresponds to 80 pixels.

4. The liquid crystal display device as set forth in claim 1, wherein:
 each of the plurality of pixels is made up of a plurality of subpixels; and
 each of the contact holes is formed in any one of the plurality of subpixels.

5. The liquid crystal display device as set forth in claim 1, wherein:
 the common electrode is made of a transparent electric conductor.

6. A liquid crystal display device as set forth in claim 1, further comprising:
 another common electrode provided in the second substrate, the another common electrode being identical with the common electrode.

* * * * *